US012210676B1

(12) United States Patent
Nizampatnam et al.

(10) Patent No.: US 12,210,676 B1
(45) Date of Patent: Jan. 28, 2025

(54) USER FEEDBACK BASED ON RETENTION PREDICTION

(71) Applicant: Apple Inc., Cupertino, CA (US)

(72) Inventors: Srinath Nizampatnam, Milpitas, CA (US); Mary A. Pyc, Campbell, CA (US); Steven A. Marchette, Saratoga, CA (US); Izzet B. Yildiz, Sunnyvale, CA (US); Grant H. Mulliken, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/243,933

(22) Filed: Sep. 8, 2023

Related U.S. Application Data

(60) Provisional application No. 63/405,552, filed on Sep. 12, 2022.

(51) Int. Cl.
*G06F 3/01* (2006.01)
*G06T 7/73* (2017.01)
(Continued)

(52) U.S. Cl.
CPC .............. *G06F 3/013* (2013.01); *G06F 3/012* (2013.01); *G06F 3/015* (2013.01); *G06T 7/73* (2017.01);
(Continued)

(58) Field of Classification Search
CPC .......... G06F 3/013; G06F 3/012; G06F 3/015; G06T 7/73; G06T 2207/10028;
(Continued)

(56) References Cited

U.S. PATENT DOCUMENTS 10,082,869 B2    9/2018   Von Novak et al.
2009/0063255 A1   3/2009   Pradeep et al.
(Continued)

FOREIGN PATENT DOCUMENTS

WO    WO 2018/201067      11/2018
WO    WO-2021247310 A1 *   12/2021   ............. A61B 5/168

OTHER PUBLICATIONS

U.S. Receiving Office, International Search Report and Written Opinion issued Nov. 22, 2023 which pertains to PCT Application No. PCT/US2023/032365, 16 pages.

*Primary Examiner* — Lisa S Landis
(74) *Attorney, Agent, or Firm* — Thompson Hine LLP

(57) ABSTRACT

Various implementations disclosed herein include devices, systems, and methods that assess physiological data of a user and a scene understanding of a physical environment to determine a retention state. For example, an example process may include obtaining physiological data in an environment during a first period of time. The process may further include identifying one or more of the objects in the environment based on determining a scene understanding of the environment. The process may further include determining, based on the physiological data and the scene understanding, features associated with interaction events for the one or more objects. The process may further include determining, based on the features, a retention state during the first period of time, the retention state associated with retention of a concept associated with an object of the one or more objects. The process may further include providing feedback based on identifying the retention state.

25 Claims, 9 Drawing Sheets

(51) Int. Cl.
*G06T 19/00* (2011.01)
*G06V 10/764* (2022.01)
*G06V 10/94* (2022.01)

(52) U.S. Cl.
CPC ............ *G06T 19/00* (2013.01); *G06V 10/764* (2022.01); *G06V 10/945* (2022.01); *G06T 2207/10028* (2013.01); *G06T 2207/20092* (2013.01)

(58) Field of Classification Search
CPC .......... G06T 2207/20092; G06T 19/00; G06V 10/764; G06V 10/945
See application file for complete search history.

(56) References Cited

U.S. PATENT DOCUMENTS

| | | |
|---|---|---|
| 2021/0333871 A1 | 10/2021 | Fan et al. |
| 2021/0401339 A1 | 12/2021 | Farber et al. |

* cited by examiner

USER FEEDBACK BASED ON RETENTION PREDICTION

CROSS-REFERENCE TO RELATED APPLICATIONS

This Application claims the benefit of U.S. Provisional Application Ser. No. 63/405,552 filed Sep. 12, 2022, which is incorporated herein in its entirety.

TECHNICAL FIELD

The present disclosure generally relates to electronic devices, and in particular, to systems, methods, and devices for determining a retention state based on features associated with interaction events.

BACKGROUND

Electronic devices may be used to help users engage in various experiences in which particular user states are desired. Predicting subsequent fact memory while viewing content on an electronic device can facilitate a more meaningful experience. For example, an electronic device may be used to present content for an education experience in which the user desires to learn. Such content is generally not responsive or adaptive to the user's retention state and thus may not be as effective or efficient as desired. Content creators and systems may be able to provide better and more tailored user experiences for concept retention based on predicting subsequent fact memory with higher accuracy as a user interacts with portions of the content.

SUMMARY

Various implementations disclosed herein include devices, systems, and methods that present content and assess a retention state associated with retention of a concept. A retention state may refer to whether or not a person remembers a fact or concept or to a level of retention, e.g., how much of a set of facts or concepts are being retained, how well a set of facts or concepts are being retained, and the like. Various implementations disclosed herein include devices, systems, and methods focus on obtaining physiological data (e.g., eye-tracking data, head movement, and hand gestures) and a scene understanding to identify specific interactions with virtual/real-world objects that are indicative of memory/concept retention during a learning/productivity experience in order to provide feedback by modifying (e.g., enhancing) the content based on the retention state. For example, a visual and/or audio notification may be provided to the user to focus on a particular object or portion of an object for improved concept retention (e.g., improved memory). The interactions over time are used to determine features that are input into a machine learning algorithm trained to predict subsequent fact memory. For example, user studies/experiments may include having a user to focus on a particular phrase or a portion of an image to memorize, and as the user is focusing his or her attention upon that phrase (or a portion of an image), physiological data may be collected and determined as features of an interaction event. Some of these features (e.g., machine learning inputs) may include time spent fixated on objects, a number of revisits to the same object, average change in pupil diameter across different visits, blinks during different visits, saccade amplitudes/velocities while exploring the object, and the like.

The physiological data may include eye tracking data (e.g., gaze direction, gaze angle, pupil diameter, pupil location, etc. obtained via video-based eye tracker, retinal/fundus imaging based eye tracking, electrooculography based eye tracking, magnetic scleral search coil based eye tracking, etc.), head representation/tracking data (e.g., head pose, rotation speed, etc. using image data, depth data, accelerometer data, magnetometer data, gyroscope data etc.), hand tracking data (e.g., hand pose, movement speed, etc. using image data, depth data, accelerometer data, magnetometer data, gyroscope data etc.) or other physiological data (e.g., heart rate, respiration rate, body temperature, electrocardiogram, blood oxygen saturation, skin conductance, and the like).

Context of the environment may additionally be used to determine a retention state. For example, a scene analysis of an experience can determine a scene understanding of the visual and/or auditory attributes associated with content being presented to the user (e.g., what is being presented in video content) and/or attributes associated with the environment of the user (e.g., where is the user, what is the user doing, what objects are nearby). These attributes of both the presented content and environment of the user can improve the determination of the user's concept retention based on his or her eye movement and gaze behavior regarding an interaction event (e.g., focusing on an area of an object).

Physiological data, such as EEG amplitude/frequency, sensor data corresponding to pupil modulation, sensor data corresponding to eye gaze saccades, etc., can depend on the individual, characteristics of the scene in front of him or her (e.g., video content), and attributes of the physical environment surrounding the user including the activity/movement of the user. Physiological data can be obtained while using a device with eye tracking technology (and other physiologic sensors) while tasks are performed. In some implementations, physiological data can be obtained using other sensors, such as electroencephalography (EEG) sensors or electrodermal activity (EDA) sensors. Observing repeated measures of physiological data to an experience can give insights about the intent of the user based on his or her eye movement and gaze behavior.

In some implementations, determining a retention state associated with retention of a concept associated with an object may be based on a characteristic of the user (e.g., physiological data) and an environment of the user (e.g., real-world physical environment, a virtual environment, or a combination of each). The device (e.g., a handheld, laptop, desktop, or head-mounted device (HMD)) provides an experience (e.g., a visual and/or auditory experience) of the real-world physical environment or an extended reality (XR) environment. The device obtains, with one or more sensors, physiological data (e.g., EEG amplitude, pupil modulation, eye gaze saccades, head movements measured by an inertial measurement unit (IMU), etc.) associated with the user. Based on the obtained physiological data, the techniques described herein can determine an interaction event during the experience. Based on the physiological data and associated physiological response (e.g., a user focusing on a particular region of the content), the techniques can provide a response to the user based on the interaction event and adjust the content corresponding to the experience.

Some implementations assess physiological data and other user information to help improve a user experience. In such processes, user preferences and privacy should be respected, as examples, by ensuring the user understands and consents to the use of user data, understands what types of user data are used, has control over the collection and use of user data and limiting distribution of user data, for example, by ensuring that user data is processed locally on the user's device. Users should have the option to opt in or out with respect to whether their user data is obtained or used or to otherwise turn on and off any features that obtain or use user information. Moreover, each user should have the ability to access and otherwise find out anything that the system has collected or determined about him or her.

In general, one innovative aspect of the subject matter described in this specification can be embodied in methods that include the actions of, at an electronic device having a processor and one or more sensors, obtaining physiological data in an environment during a first period of time utilizing the one or more sensors, the environment including one or more objects, identifying the one or more of the objects in the environment based on determining a scene understanding of the environment, determining, based on the physiological data and the scene understanding, features associated with interaction events for the one or more objects, determining, based on the features, a retention state during the first period of time, the retention state associated with retention of a concept associated with an object of the one or more objects, and providing feedback based on identifying the retention state.

These and other embodiments can each optionally include one or more of the following features.

In some aspects, the physiological data includes positional information and velocity information for a left eye and a right eye. In some aspects, the physiological data includes an interpupillary distance (IPD) between a right eye and a left eye, and a diameter of the left eye and a diameter of the right eye. In some aspects, the physiological data includes a direction of a gaze, a velocity of the gaze, or pupillary fixations. In some aspects, the physiological data includes an image of an eye or electrooculography (EOG) data. In some aspects, the physiological data includes images of a head from the one or more sensors. In some aspects, obtaining the physiological data includes tracking a pose and a movement of a head.

In some aspects, determining the scene understanding of the physical environment includes determining a location, a speed, or a direction of motion of at least one of the one or more objects. In some aspects, determining the scene understanding includes generating a three-dimensional (3D) representation of the physical environment. In some aspects, the scene understanding is based on obtaining sensor data from the one or more sensors corresponding to a physical environment.

In some aspects, the one or more objects includes multiple objects, and wherein determining the retention state during the first period of time is based on assessing transitions amongst the multiple objects.

In some aspects, the determined features includes at least one of a time spent of a gaze fixated on the one or more objects, a number of revisits to the one or more objects, an average change in pupil diameter during the first period of time, blinks during different subsequent periods of time, or saccade amplitudes/velocities while exploring the one or more objects during the first period of time. In some aspects, the features were identified based on user experiments for a plurality of different users that include user instructions to focus on a particular object of the one or more objects during a study period of time, wherein physiological data is obtained for a plurality of different users during the study period of time.

In some aspects, determining features associated with interaction events for the one or more objects is based on determining salient and non-salient regions associated with the one or more objects, and determining gaze intersections with a salient region or a non-salient region.

In some aspects, determining features associated with interaction events for the one or more objects includes determining scene-induced pupil response variation characteristics for a particular object of the one or more objects, and determining an interaction event based on the scene-induced pupil response variation characteristics for the particular object.

In some aspects, providing the feedback based on identifying the retention state includes updating a view of a display of the electronic device during the first period of time. In some aspects, updating the view of the display is based on the physiological data. In some aspects, providing the feedback based on identifying the retention state includes adjusting content in response to determining an interaction event associated with the retention of the concept associated with the object. In some aspects, providing the feedback based on identifying the retention state includes providing a level of quality of retention of the concept associated with the object, and providing a notification based on the concept associated with the object.

In some aspects, the method may further include determining, based on the features, a plurality of retention states during multiple periods of time, aggregating the determined features associated with the plurality of retention states associated with multiple objects of the one or more objects, and updating the feedback based on the aggregated features.

In some aspects, the retention state during the first period of time is based on using a machine learning classifier model, wherein the physiological data are input into the machine learning classification model to identify the retention of the concept associated with the object. In some aspects, the machine learning classification model is trained based on a plurality of eye characteristics, head pose characteristics, and hand gesture characteristics.

In some aspects, the physiological data is obtained from sensor data from the one or more sensors, and wherein the sensor data includes depth data and light intensity image data obtained during a scanning process.

In some aspects, the environment is a physical environment. In some aspects, the environment is a virtual environment. In some aspects, the environment is a mixed reality (MR) experience. In some aspects, the electronic device is a head-mounted device (HMD).

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
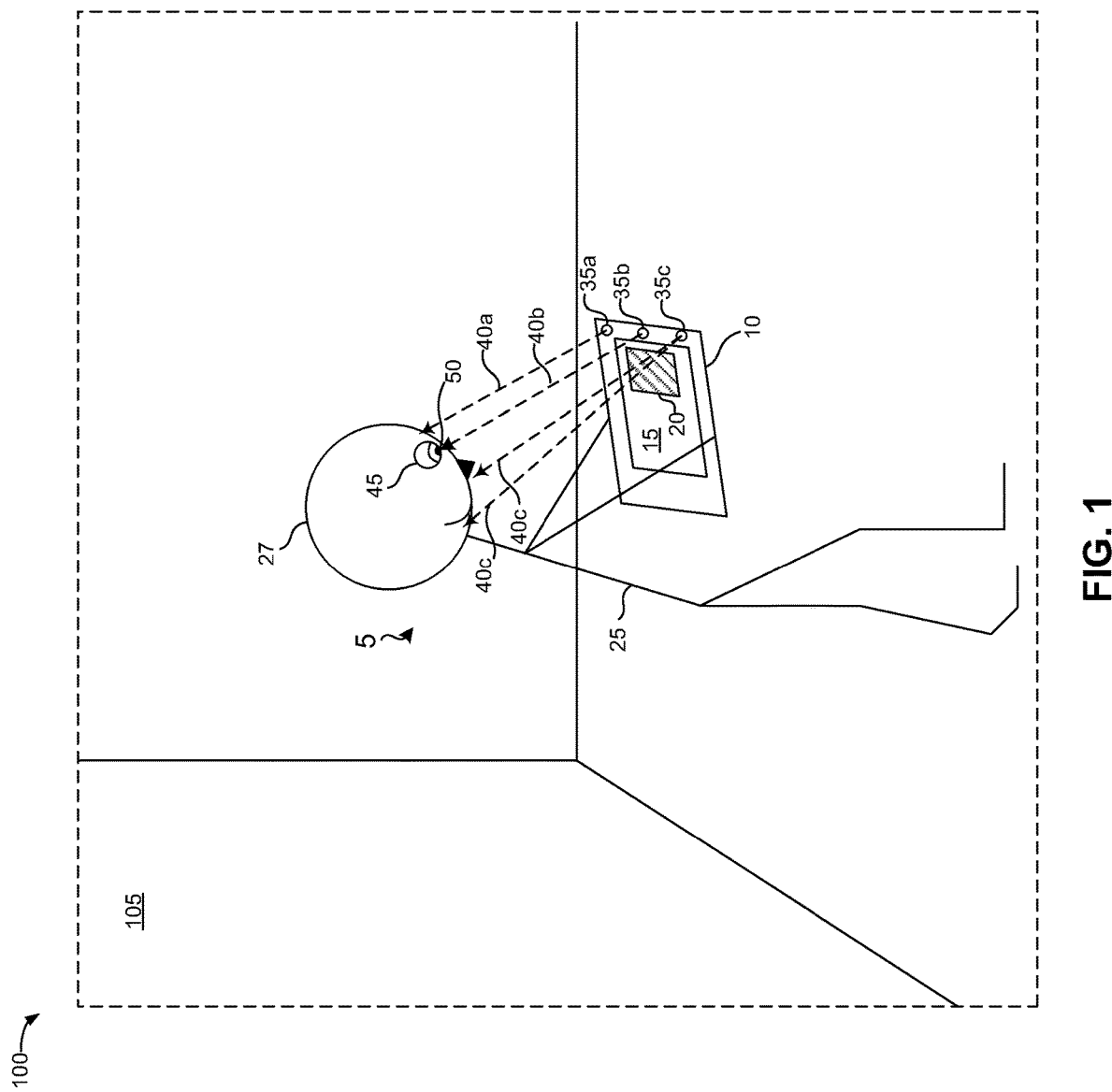
FIG. 1 illustrates a device obtaining sensor data from a user according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an example environment 100 of a real-world environment 105 (e.g., a room) including a device 10 with a display 15. In some implementations, the device 10 displays content 20 to a user 25. For example, content 20 may be a button, a user interface icon, a text box, a graphic, an avatar of the user or another user, etc. In some implementations, the content 20 can occupy the entire display area of display 15.

The device 10 obtains image data, motion data, and/or physiological data (e.g., pupillary data, facial feature data, etc.) from the user 25 via a plurality of sensors (e.g., sensors 35a, 35b, and 35c). For example, the device 10 obtains eye gaze characteristic data 40b via sensor 35b, upper facial feature characteristic data 40a via sensor 35a, and lower facial feature characteristic data 40c via sensor 35c. Additionally, each of the plurality of sensors (e.g., sensors 35a, 35b, and 35c) can capture information about the position, location, motion, pose, etc., of the head 27 and/or body of the user 25.

While this example and other examples discussed herein illustrate a single device 10 in a real-world environment 105, the techniques disclosed herein are applicable to multiple devices as well as to other real-world environments. For example, the functions of device 10 may be performed by multiple devices, with the sensors 35a, 35b, and 35c on each respective device, or divided among them in any combination.

In some implementations, the plurality of sensors (e.g., sensors 35a, 35b, and 35c) may include any number of sensors that acquire data relevant to the appearance of the user 25. For example, when wearing a head-mounted device (HMD), one sensor (e.g., a camera inside the HMD) may acquire the pupillary data for eye tracking, and one sensor on a separate device (e.g., one camera, such as a wide range view) may be able to capture all of the facial feature data of the user. Alternatively, if the device 10 is an HMD, a separate device may not be necessary. For example, if the device 10 is an HMD, in one implementation, sensor 35b may be located inside the HMD to capture the pupillary data (e.g., eye gaze characteristic data 40b), and additional sensors (e.g., sensor 35a and 35c) may be located on the HMD but on the outside surface of the HMD facing towards the user's head/face to capture the facial feature data (e.g., upper facial feature characteristic data 40a via sensor 35a, and lower facial feature characteristic data 40c via sensor 35c) and capture information about the position, location, motion, pose, etc., of the head 27 and/or body of the user 25.

In some implementations, as illustrated in FIG. 1, the device 10 is a handheld electronic device (e.g., a smartphone or a tablet). In some implementations the device 10 is a laptop computer or a desktop computer. In some implementations, the device 10 has a touchpad and, in some implementations, the device 10 has a touch-sensitive display (also known as a "touch screen" or "touch screen display"). In some implementations, electronic device 10 may be worn by a user. For example, electronic devices 10 may be a watch, a HMD, head-worn device (glasses), headphones, an ear mounted device, and so forth. In some implementations, functions of the device 10 is accomplished via two or more devices, for example, a mobile device and base station or a head mounted device and an ear mounted device. Various capabilities may be distributed amongst multiple devices, including, but not limited to, power capabilities, CPU capabilities, GPU capabilities, storage capabilities, memory capabilities, visual content display capabilities, audio content production capabilities, and the like. The multiple devices that may be used to accomplish the functions of electronic device 10 may communicate with one another via wired or wireless communications and/or via an intermediary device such as a playback session server.

In some implementations, the device 10 includes an eye tracking system for detecting eye position and eye movements via eye gaze characteristic data 40b. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 25. Moreover, the illumination source of the device 10 may emit NIR light to illuminate the eyes of the user 25 and the NIR camera may capture images of the eyes of the user 25. In some implementations, images captured by the eye tracking system may be analyzed to detect position and movements of the eyes of the user 25, or to detect other information about the eyes such as color, shape, state (e.g., wide open, squinting, etc.), pupil dilation, or pupil diameter. Moreover, the point of gaze estimated from the eye tracking images may enable gaze-based interaction with content shown on the near-eye display of the device 10.

In some implementations, the device 10 has a graphical user interface (GUI), one or more processors, memory and one or more modules, programs or sets of instructions stored in the memory for performing multiple functions. In some implementations, the user 25 interacts with the GUI through hand gestures, finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program products configured for execution by one or more processors.

In some implementations, the device 10 employs various physiological sensor detection, or measurement systems. Detected physiological data may include, but is not limited to, electroencephalography (EEG), electrocardiography (ECG), electromyography (EMG), functional near infrared spectroscopy signal (fNIRS), blood pressure, skin conductance, or pupillary response. Moreover, the device 10 may simultaneously detect multiple forms of physiological data in order to benefit from synchronous acquisition of physiological data. Moreover, in some implementations, the physiological data represents involuntary data, e.g., responses that are not under conscious control. For example, a pupillary response may represent an involuntary movement.

In some implementations, one or both eyes 45 of the user 25, including one or both pupils 50 of the user 25 present physiological data in the form of a pupillary response (e.g., eye gaze characteristic data 40b). The pupillary response of the user 25 results in a varying of the size or diameter of the pupil 50, via the optic and oculomotor cranial nerve. For example, the pupillary response may include a constriction response (miosis), e.g., a narrowing of the pupil, or a dilation response (mydriasis), e.g., a widening of the pupil. In some implementations, the device 10 may detect patterns of physiological data representing a time-varying pupil diameter. In some implementations, the device 10 may further determine the interpupillary distance (IPD) between a right eye and a left eye of the user.

The user data (e.g., upper facial feature characteristic data 40a, lower facial feature characteristic data 40c, and eye gaze characteristic data 40b), including information about the position, location, motion, pose, etc., of the head 27 and/or body of the user 25, may vary in time and the device 10 may use the user data to generate and/or provide a representation of the user.

In some implementations, the user data (e.g., upper facial feature characteristic data 40a and lower facial feature characteristic data 40c) includes texture data of the facial features such as eyebrow movement, chin movement, nose movement, cheek movement, etc. For example, when a person (e.g., user 25) smiles, the upper and lower facial features (e.g., upper facial feature characteristic data 40a and lower facial feature characteristic data 40c) can include a plethora of muscle movements that may be replicated by a representation of the user (e.g., an avatar) based on the captured data from sensors 35.

The physiological data (e.g., eye data, head/body data, etc.) may vary in time and the device 10 may use the physiological data to measure one or both of a user's physiological response to the visual characteristic 30 (e.g., looking at particular content on the display 15 such as reading text) or the user's intention to interact with content 20. For example, when presented with content 20, which may include an interactive element, by a device 10, the user 25 may select the interactive element without requiring the user 25 to complete a physical button press based on the user's eye movements and gaze behavior associated with eye data, head/body data, etc. In some implementations, the physiological data may include the physiological response to a visual or an auditory stimulus of a radius of the pupil 50 after the user 25 glances at content 20, measured via eye-tracking technology (e.g., via an HMD). In some implementations, the physiological data includes EEG amplitude/frequency data measured via EEG technology, or EMG data measured from EMG sensors or motion sensors.

Figure 2A:
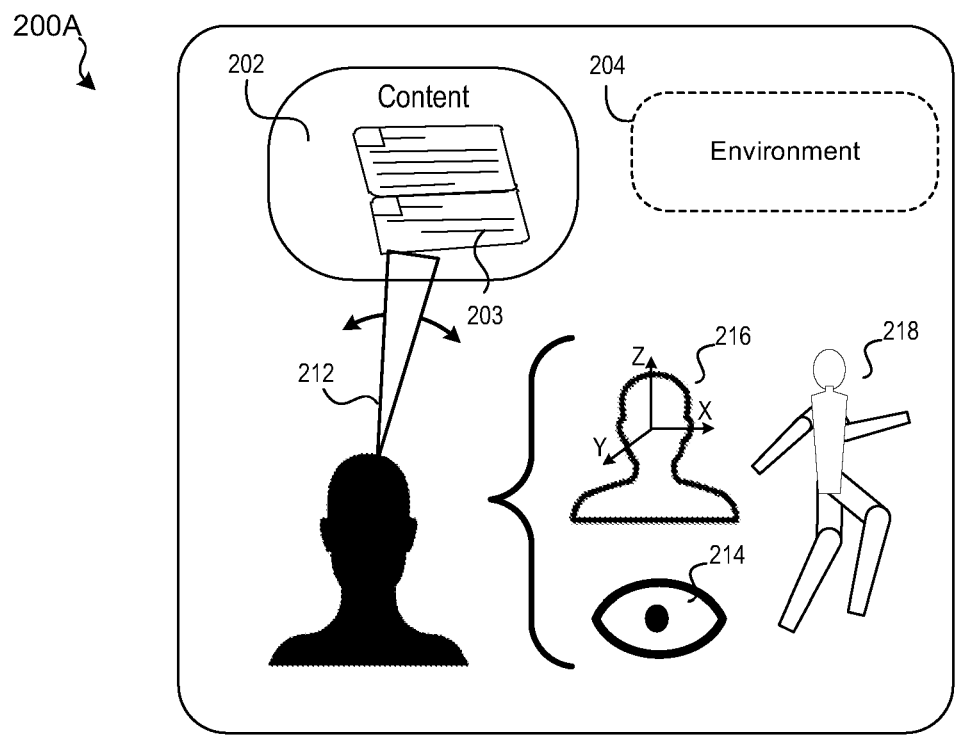
FIGS. 2A and 2B illustrate obtaining physiological data of a user viewing content in accordance with some implementations.
Figure 2B:
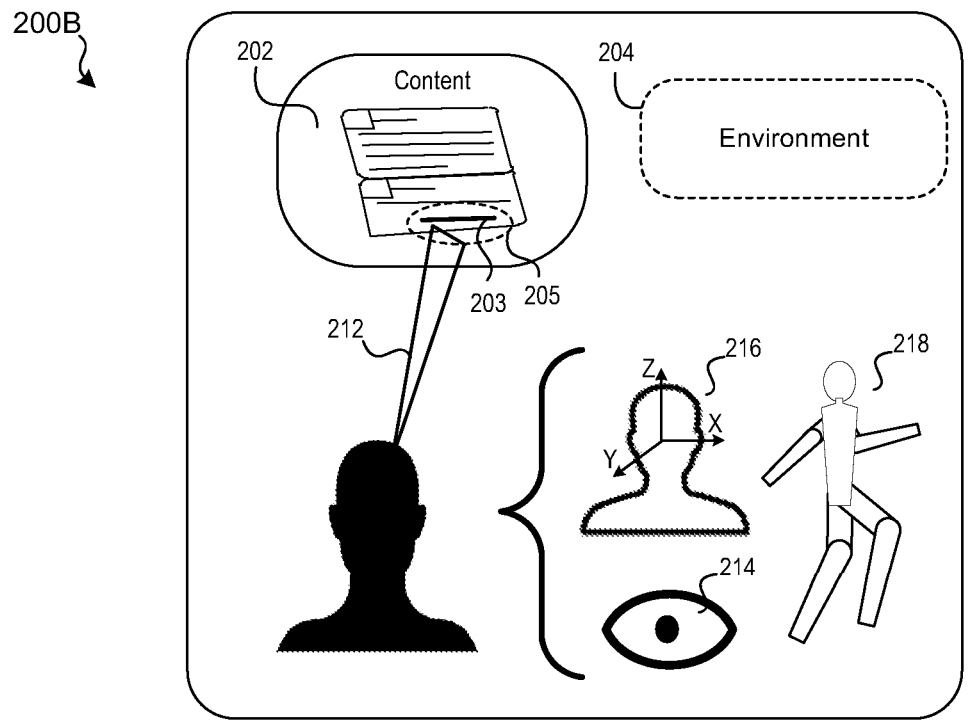

FIGS. 2A and 2B illustrate detecting eye movement and gaze behavior of a user viewing content based on physiological data. FIG. 2A illustrates a user (e.g., user 25 of FIG. 1) being presented with content 202 in an environment 204 during a content presentation where the user, via obtained physiological data, has a physiological response to the content (e.g., the user looks towards portions of the content as detected by eye gaze characteristic data 212). For example, at content presentation instant 200A, a user is being presented with content 202 that includes visual content (e.g., a video/image of an application that includes text), and the user's physiologic data such as pupillary data 214, head data 216, and body data 218 is monitored. FIG. 2B illustrates a similar example as FIG. 2A, except that the user focuses his or her gaze upon the interactive element 203 (e.g., the user wants to select the text, such as an embedded interactable icon, being presented to him or her), as illustrated at selection notification 205. Therefore, the content 202 may be updated based on the interaction/focus of the user upon the interactive element 203 (e.g., the user wants to select the embedded interactable icon represented by interactive element 250).

In the particular examples of FIGS. 2A and 2B, at content presentation instant 200A, the user's eye gaze characteristic is less focused on the content 202. Then, at content presentation instant 200B of FIG. 2B (e.g., during a focused stage), the user's eye gaze characteristic 212 appears to be focused on the interactive element 203 of the content 202. For example, the system can determine that the user's gaze may be focused upon a particular area or text, and is no longer just gazing at the content (e.g., reading the text), but wants to select a portion of the content (e.g., select an icon or engage with a portion of the text, such as placing an order on a menu) based on user's eye gaze characteristic 212, pupillary data 214, head data 216, and/or body data 218.

Figure 3:
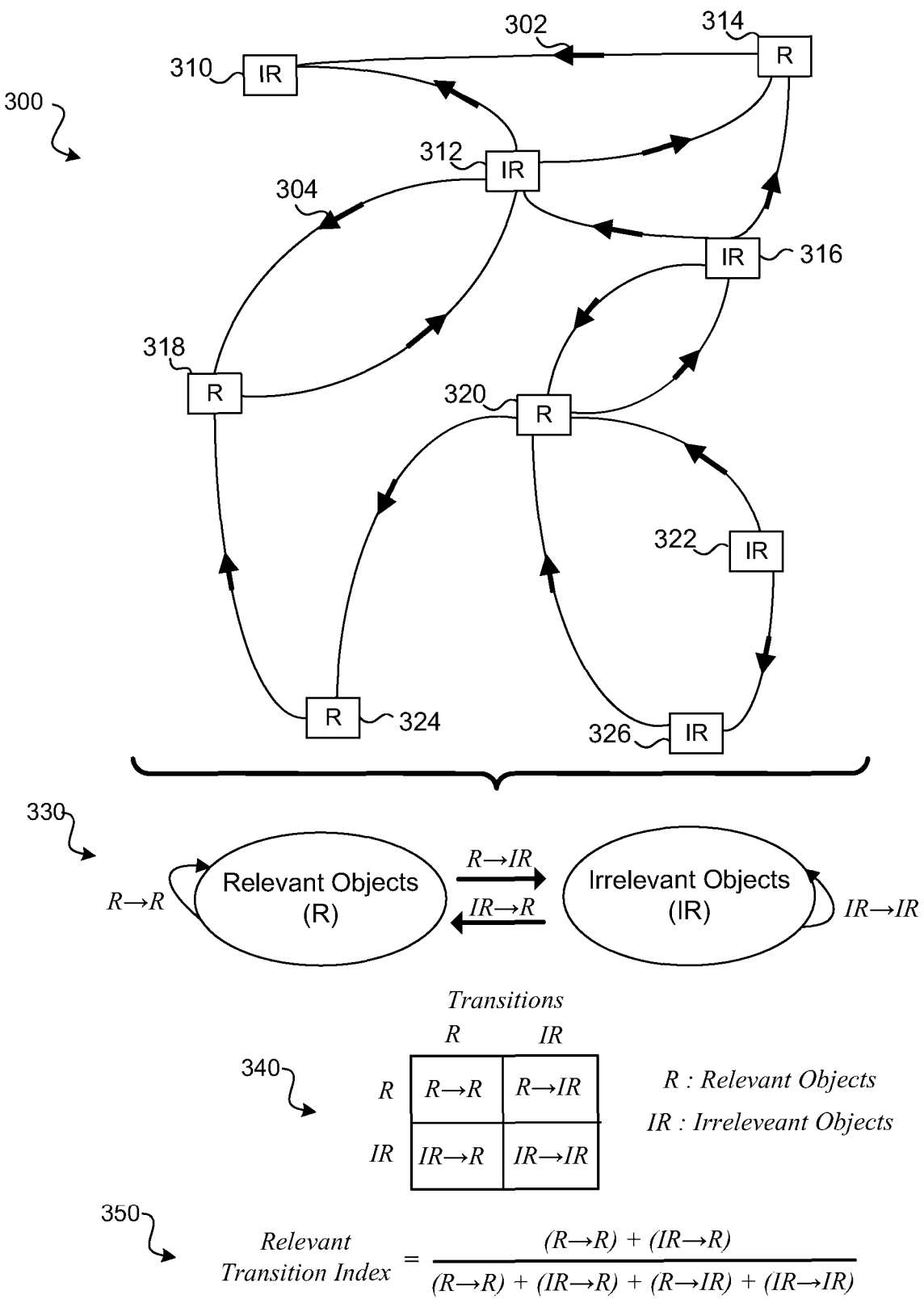
FIG. 3 illustrates a graph of transitions of eye gaze characteristics amongst multiple objects in accordance with some implementations.

FIG. 3 illustrates a graph 300 of transitions of eye gaze characteristics amongst multiple relevant and irrelevant objects in accordance with some implementations. For example, learning may involve transitioning between objects and linking ideas. Graph 300 provides an example illustration of how a user may transition between objects in a learning experience. In particular, graph 300 provides an illustration of transitions between relevant objects 314, 318, 320, 324 and irrelevant objects 310, 312, 316, 322, 326, such as transition 302 from relevant object 314 to irrelevant object 310, and transition 304 from irrelevant object 312 to relevant object 318. In some implementations, a content provider (e.g., a developer for an educational program) can determine which objects or learning objectives would be considered relevant and irrelevant objects (e.g., 0 or 1 for tracking purposes). The graph 300 can be simplified based on relevancy tracking as illustrated in the simplification chart 330 and the transitions table 340 in order to track the key transitions to relevant objects either from other relevant objects "R" or from irrelevant objects "IR" (e.g., R→R and IR→R). The relevant transition index equation 350 provides the fraction of gaze transitions to relevant objects. The relevant transition index equation 350 may be utilized as an input to a machine learning algorithm to predict a user's concept retention based on user transitions between objects in a learning segment. The utilization of tracking gaze transitions between relevant and irrelevant objects as illustrated in FIG. 3 is unique for memory prediction because it requires custom annotation but only a single simple binary label from a content developer (e.g., determining whether the object is relevant for a learning experience), and uses that information to derive a metric of structure in the pattern of gaze over time. In some implementations, relevancy may be utilized to further determine gaze features such that gaze features with respect to individual relevant objects can predict subsequent fact memory.

In some implementations, infer relevant objects may be determined based on feedback from content providers based on what subject matter experts view as important in the subject area view of the content. For example, objects where the subject matter experts spent time on (e.g., great than a threshold-in-seconds) would be relevant, and what they ignored (e.g., less than a threshold-in-seconds) would be irrelevant. Additionally, a percentage of relevance may be determined based on averaging across different subject matter experts. The averaging across different subject matter experts may also aid in determining how much in agreement different experts are. In some implementations, relevant objects may be determined from beginners, who may have just learned a particular concept. However, a beginner's subsequent memory may be used to find out a percent relevance. In other words, users (e.g., learners) who did really well in their assessments may be treated as experts, and then a percentage of relevance may be determined as described herein.

Figure 4:
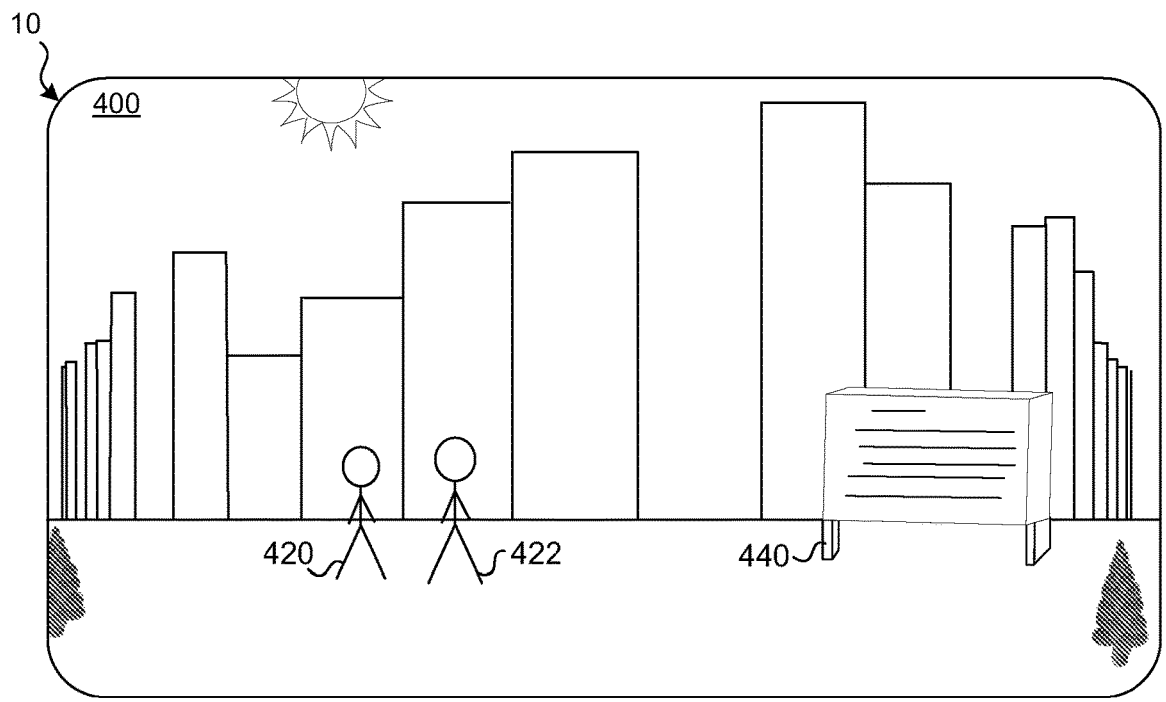
FIG. 4 illustrates a view of a device in a physical environment in accordance with some implementations.

FIG. 4 illustrates a view of a device (e.g., device 10) of a physical environment 400 in accordance with some implementations. The physical environment 400 is a city park with a city (buildings) in the background that includes identifiable objects within the view of the device 10. For example, the objects include bystanders 420 and 422, and an informational sign 440 that includes content (e.g., a billboard or an information plaque such as an historical marker). In some implementations, the view of the physical environment 400 may be an image (e.g., a color photograph) of a city park, thus the informational sign 440 is a physical sign at the park (e.g., historical plaque). Alternatively, the view of the physical environment 400 may be a fully or partially immersive interactive experience with virtual content, such as an XR experience (e.g., while wearing device 10 as an HMD); therefore, the informational sign 440 may be a physical sign at the park (e.g., historical plaque) or may be virtual content that the user is trying to study and possibly remember an image or something written thereon (e.g., an historical fact).

Figure 5:
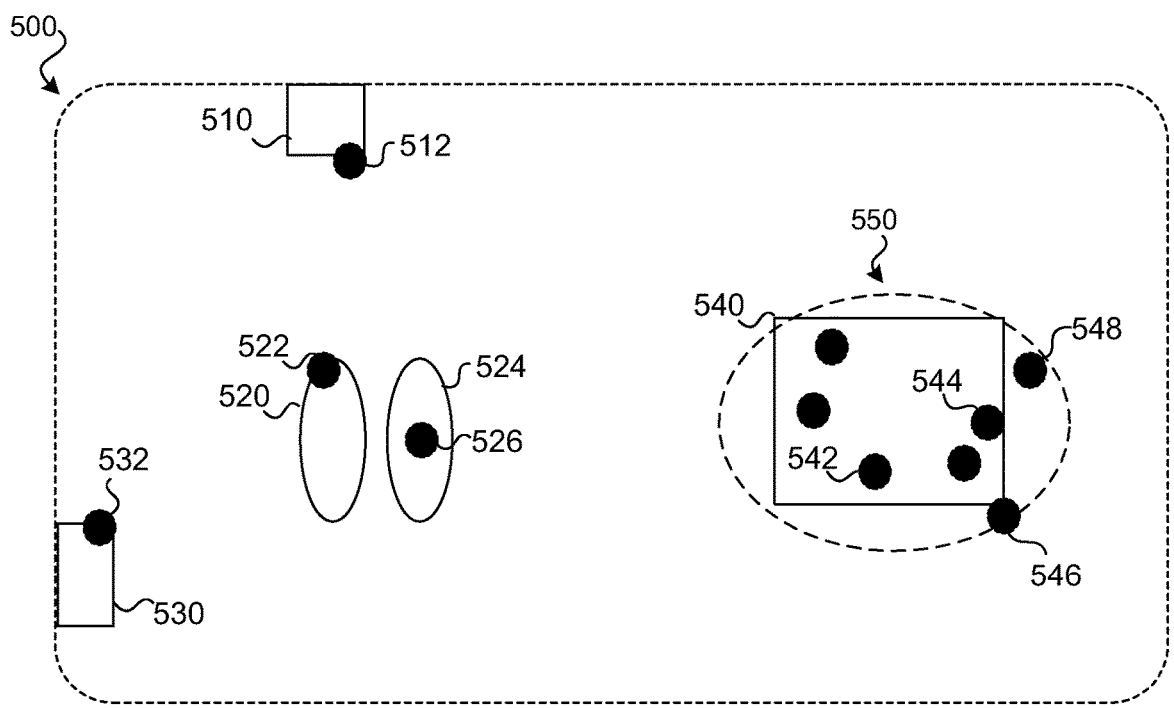
FIG. 5 illustrates a view of a gaze/attention tracker based on the view of FIG. 4 in accordance with some implementations.

FIG. 5 illustrates a view 500 of a gaze/attention tracker based on the view of FIG. 4 in accordance with some implementations. For example, view 500 illustrates gaze locations upon a representation of a view of physical environment 400 based on objects within the view. For example, gaze location includes gaze point 512 upon representation 510 of the sun, gaze point 522 upon representation 520 of the bystander 420, gaze point 526 upon representation 524 of the bystander 422, gaze point 532 upon representation 530 of a tree, and the plurality of gaze points (e.g., gaze point 542, 544, 546, 548) that are at or close to the representation 540 of informational sign 440. In particular, FIG. 5 illustrates how an object may be segregated into salient and non-salient regions, where salient regions within an object are supposed to draw people's attention. In an exemplary embodiment, if the view of physical environment 400 is an image and is classified as one singular object, a content developer of the information within the image may want to attract the user's attention to content displayed on the informational sign 440. For example, according to techniques described herein, that area or region may be classified as a salient region (e.g., salient region 550). Gaze intersections specifically onto these salient regions (e.g., salient region 550) may result in better predictive power for memory classification by a machine learning classifier. In an exemplary technique described herein, a method may include determining features associated with interaction events for one or more objects based on determining salient and non-salient regions associated with the one or more objects (e.g., salient region 550) and determining gaze intersections with a salient region or a non-salient region (e.g., determining a user is focused his or her gaze upon salient region 550).

Figure 6C:
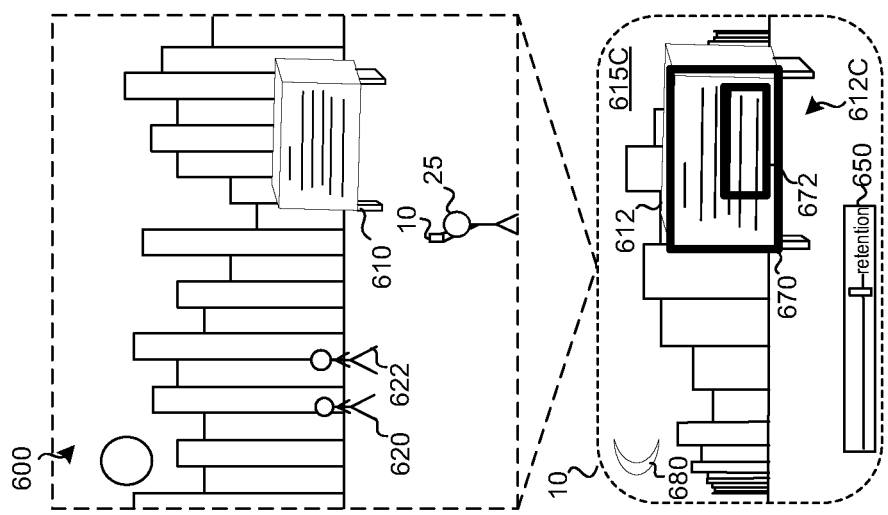
FIGS. 6A-6C illustrate exemplary views of an electronic device viewing an XR environment, in accordance with some implementations.
Figure 6B:
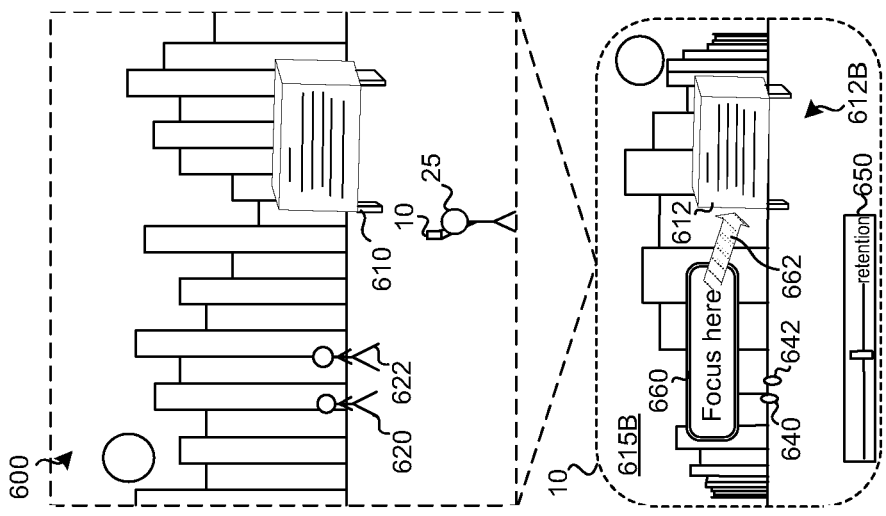
Figure 6A:
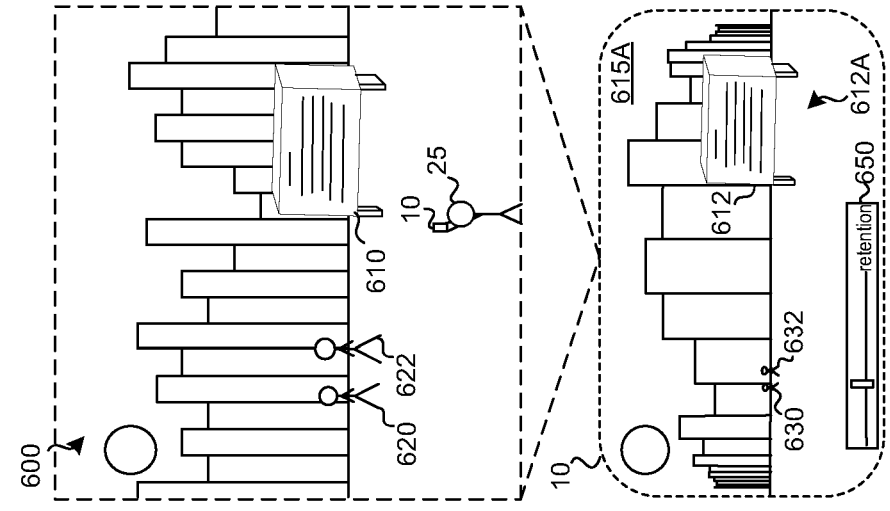

FIGS. 6A-6C illustrate exemplary views of an electronic device viewing an XR environment in accordance with some implementations. In particular, FIGS. 6A-6C illustrate displaying different examples of feedback content (e.g., virtual content) for a user viewing an XR environment. For instance, FIGS. 6A-6C illustrate an exemplary electronic device 10 providing view 615A of 3D environment 612A, view 615B of 3D environment 612B, and view 615C of 3D environment 612C, respectively, operating in a physical environment 600 during a viewing of content (e.g., a learning experience while walking in a city park). For example, FIGS. 6A-6C may represent a viewing of content at three different periods of time while the user 25 views content on the display of device 10, and views the physical environment 600. In these examples of FIGS. 6A-6C, the physical environment 600 is a city park with a city (buildings) in the background that includes bystanders 620 and 622, and an informational sign 610 that includes content (e.g., a billboard or an information plaque such as an historical marker). In particular, FIGS. 6A-6C each illustrate the user 25 (e.g., a viewer during an experience) viewing content on device 10 during a sunrise (e.g., early in the morning) in a city park with the city landscape in the background. The informational sign 610 may be a physical sign at the park (e.g., historical plaque) that a user sees in a pass-through video, or an informational sign 610 that may be virtual content that the user is trying to study and possibly remember an image or something written thereon (e.g., an historical fact).

The electronic device 10 includes one or more cameras, microphones, depth sensors, or other sensors that can be used to capture information about and evaluate the physical environment 600 and the objects within it, as well as information about the user 25 of the electronic device 10 (e.g., physiological data as discussed herein, positional data of the user 25, and the like). The information about the physical environment 600 and/or user 25 may be used to provide feedback as the user is watching visual content and/or listening to audio content during an experience. For example, a learning session may provide views (e.g., views 615A, 615B, and 615C) of a 3D environment (e.g., 3D environment 612A, 612B, and 612C) that is generated based on camera images and/or depth camera images of the physical environment 100 and, optionally, include virtual content as part of the meditation experience to simulate a nature walk in the city park, but to supplement some of the physical content with virtual content (e.g., content enhancements, such as feedback data to aid the user in a learning experience).

In the example illustrated in FIG. 6A, the electronic device 10 provides a view 615A that includes a representation 630 of bystander 620, representation 632 of bystander 622, and a representation 612 of the informational sign 610. FIG. 6A provides a view 615A that mimics the environment 600, that is, shows a view that includes a representation of the sun in the same location (e.g., during a sunrise). The view 615A further includes a retention indicator 650 that may be displayed to the user 25 during the experience that indicates to user 25 that how conducive the current view 615A may be for concept retention based on the user 25's physiological data (e.g., gaze characteristics, etc.). Alternatively, in some implementations, the retention indicator 650 may be interactive (e.g., a user 25 may be able to slide the bar) to allow the user 25 to change one or more attributes associated with the view 615A to improve a retention level such as a level of immersion (e.g., blocking out potential distractions, changing the weather, time of day (sunrise/sunset/moon), and the like) and/or to provide feedback to improve a learning experience. Alternatively, the experience level indicator is not displayed in the view 615A, but the data is stored for content developers.

Similarly, in the example illustrated in FIG. 6B, the electronic device 10 provides a view 615B that includes a representation 640 of bystander 620, representation 642 of bystander 622, a representation 612 of the informational sign 610, and a retention indicator 650. FIG. 6B provides a view 615B that further includes feedback data (e.g., virtual content) such as feedback content element 660 (e.g., a notification text bubble) and feedback content element 662 (e.g., an arrow pointing towards a relevant object—representation 612 of the informational sign 610). Additionally, in some implementations, the environment may be altered for a better learning experience. For example, FIG. 6B provides a view 615B that has altered the time of day (e.g., now a sunset), as well as changed the appearance of the representations 640, 642 of the bystanders 620, 622, respectively. For example, the user 25, while trying to study (e.g., read from the historical plaque, i.e., information sign 610), wants to view the background of the city (e.g., while wearing an HMD) during a sunset. Additionally, the user may select, or the system may automatically, blur out or replace with virtual objects any detected object that may interfere with the user's learning session. For example, if people are greater than a particular threshold away from the user 25 (e.g., 10 feet or greater) then the system may alter the view of the representations 640, 642 of the bystanders 620, 622, respectively, as shown (e.g., opaque ovals instead of people). Similarly, in the example illustrated in FIG. 6C, the electronic device 10 provides a view 615C that includes a representation 680 of a moon, a representation 612 of the informational sign 610, and a retention indicator 650. FIG. 6C provides a view 615C that further includes feedback data (e.g., virtual content) such as feedback content element 670 and feedback content element 672 (e.g., highlighted portions of a relevant object and/or towards a salient region within the relevant object—representation 612 of the informational sign 610). Moreover, FIG. 6C provides a view 615C that has altered the time of day (e.g., now at nighttime), as well as removed the representations 640, 642 of the bystanders 620, 622, respectively. For example, the user 25, while studying in the city park, is viewing the background of the city (e.g., while wearing an HMD) during the nighttime for a more conducive learning experience (e.g., focus more the relevant object as opposed to irrelevant objects in the background of the view).

Additionally, the user may select, or the system may automatically, blur out, replace with virtual objects, or remove any detected object that may interfere with the user's learning session. For example, in the example of view 615C, if people are greater than a particular threshold away from the user 25 (e.g., 10 feet or greater) then the system may alter the view 615C and remove the representations 640, 642 of the bystanders 620, 622, respectively. Thus, if the bystanders 620 and/or 622 walk closer to the user (e.g. less than 20 feet), then representations 640, 642, respectively, may start to slowly fade in as they walk closer to user 25 until they reach another threshold (e.g., less than 10 feet), and then the representations 640, 642, may be completely shown, or an actual view of the bystanders 620, 622 may "breakthrough" the view 615 so that user 25 can clearly see that objects are close to them.

Figure 7:
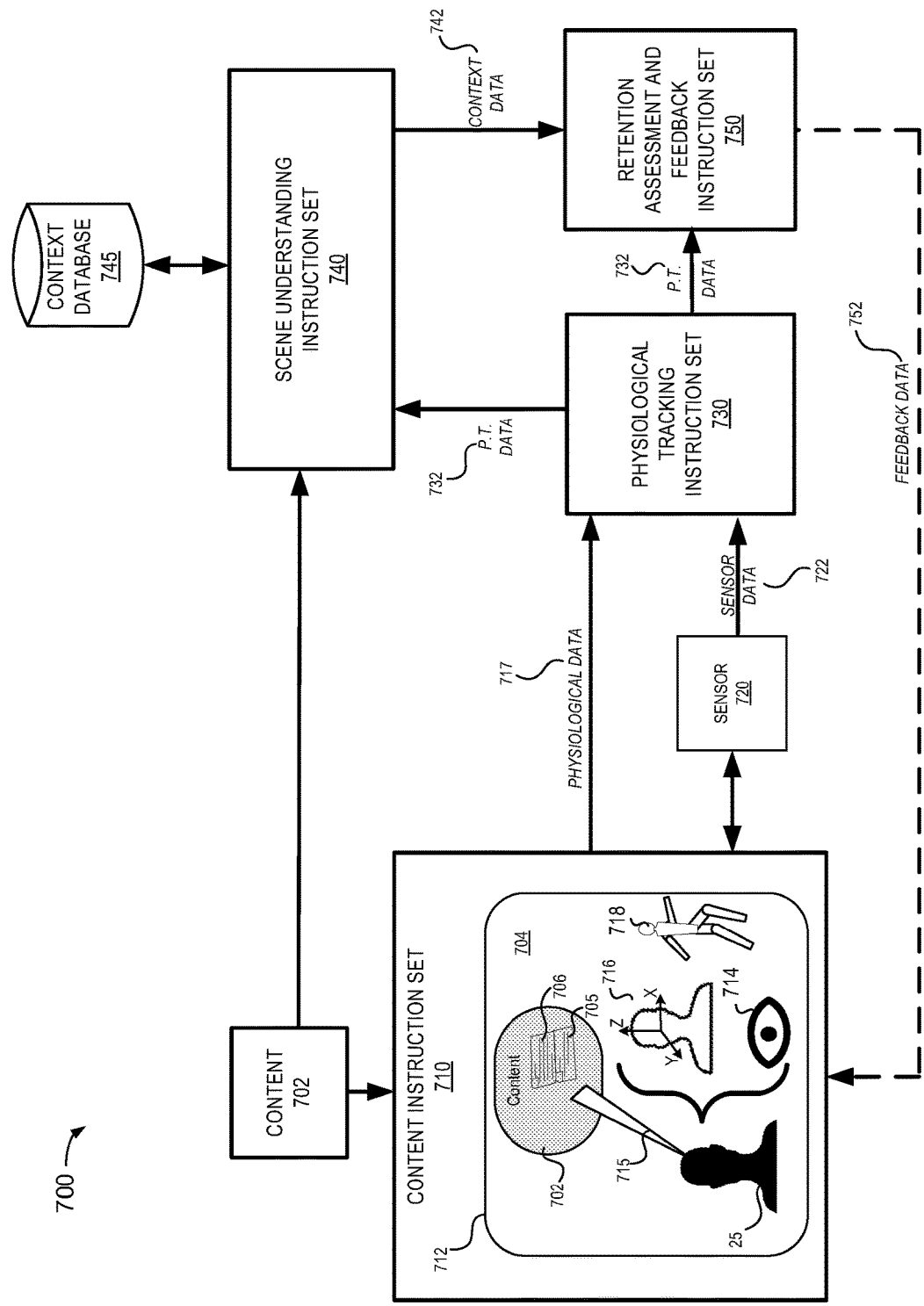
FIG. 7 illustrates a system diagram for assessing physiological data of a user and a scene understanding of a physical environment to determine a retention state in accordance with some implementations.

FIG. 7 is a system flow diagram of an example environment 700 in which a retention assessment and feedback system can assess physiological data of a user and a scene understanding of a physical environment to determine a retention state associated with retention of a concept according to some implementations. In some implementations, the system flow of the example environment 700 is performed on a device (e.g., device 10 of FIG. 1), such as a mobile device, desktop, laptop, or server device. The content of the example environment 700 can be displayed on a device (e.g., device 10 of FIG. 1) that has a screen (e.g., display 15) for displaying images and/or a screen for viewing stereoscopic images such as an HMD. In some implementations, the system flow of the example environment 700 is performed on processing logic, including hardware, firmware, software, or a combination thereof. In some implementations, the system flow of the example environment 700 is performed on a processor executing code stored in a non-transitory computer-readable medium (e.g., a memory).

The system flow of the example environment 700 acquires and presents content (e.g., video content, a series of image data, a single image, etc.) to user 25, analyzes the content and/or the environment for context data (e.g., a scene understanding), obtains physiological data associated with the user during presentation of the content (e.g., eye, head, hand gesture data, etc.), and identifies specific interactions with virtual/real-world objects that are indicative of memory/concept retention during a learning/productivity experience (e.g., an XR experience). For example, if the user 25 focuses on an object for a certain period of time, revisits to the same object, average change in pupil diameter across different visits, blinks during different visits, saccade amplitudes/velocities while exploring the object, transitions between objects (e.g., relevant object 705 and relevant object 706), and the like, those interaction events with one or more objects can be tracked and assessed for memory retention. For example, a retention assessment and feedback technique described herein determines, based on obtained physiological data and a scene understanding to identify one or more objects, features associated with interaction events for the one or more objects, determines a retention state associated with retention of a concept associated with an object of the one or more objects during an experience (e.g., learning experience), and provides feedback (e.g., to the user and/or content developers) based on identifying the retention state (e.g., a notification, auditory signal, an alert, and the like, that alerts the user to the current retention level, suggests where to focus, etc.).

The example environment 700 includes a content instruction set 710 that is configured with instructions executable by a processor to provide and/or track content 702 for display on a device (e.g., device 10 of FIG. 1). For example, the content instruction set 710 provides content presentation instant 712 that includes content 702 to a user 25 while the user is within a physical environment 704 (e.g., a room, outside, etc.). The content 702 includes object 705 and object 706 (e.g., relevant objects). For example, content 702 may include background image(s) and sound data (e.g., a video). The content presentation instant 712 may be an XR experience that includes some virtual content and some images or views of a physical environment. Alternatively, the user may be wearing an HMD and is looking at a real physical environment either via a live camera view, or the HMD allows a user to look through the display, such as wearing smart glasses that a user can see through, but still be presented with visual and/or audio cues. During an experience, while a user 25 is viewing the content 702, eye gaze characteristic data 715 and pupillary data 714 of the user's eyes can be monitored and sent as physiological data 717. Other physiological data can be monitored and sent as physiological data 717 such as head movement data 716 and body movement data 718 (e.g., hand gesture data) obtained from an IMU and/or image data. For example, hand gesture data may be obtained that is associated with detected hand movements based on image analysis or may be collected by an input device such as a watch or other sensor data. Additional physiological data can be monitored and sent as physiological data 717 such as heart rate, respiration rate, body temperature, electrocardiogram, blood oxygen saturation, skin conductance, image data (facial, body, etc.), EEG amplitude, pupil modulation, eye gaze saccades, and the like.

The environment 700 further includes a physiological tracking instruction set 730 to track a user's physiological attributes as physiological tracking data 732 using one or more of the techniques discussed herein or as otherwise may be appropriate. For example, the physiological tracking instruction set 730 may acquire physiological data 717 (e.g., eye gaze characteristic data 715, pupillary data 714) from the user 25 viewing the content 702. Additionally, or alternatively, a user 25 may be wearing a sensor 720 (e.g., such as an EEG sensor, an EDA sensor, heart rate sensor, etc.) that generates sensor data 722 (e.g., IMU or pose data for the head or body, EEG data, EDA data, heart rate data, and the like) as additional physiological data. Thus, as the content 702 is presented to the user as content presentation instant 712, the physiological data 717 (e.g., eye gaze characteristic data 715, pupillary data 714) and/or sensor data 722 (e.g., head movement data 716 and body movement data 718) is sent to the physiological tracking instruction set 730 to track a user's physiological attributes as physiological tracking data 732, using one or more of the techniques discussed herein or as otherwise may be appropriate. In some implementations, the information for the eyes may be acquired for both azimuth and elevation for both position and velocity for each eye (e.g., eight channels of data for the classification algorithm). In some implementations, the eye data may further include IPD information (e.g., one channel of data for the classification algorithm) and a pupil diameter for the left eye and the right eye (e.g., two channels of data for the classification algorithm). Obtaining eye data may involve obtaining EEG information, images of the eye, and/or EOG data from which gaze direction, gaze angle, and/or eye movement can be determined. In some implementations, the eye data may further include a direction of the gaze, a velocity of the gaze, or a combination thereof.

In an example implementation, the environment 700 further includes a scene understanding instruction set 740 that is configured with instructions executable by a processor to obtain the experience data presented to the user (e.g., content 702) and other sensor data (e.g., image data of the environment 704, the user's 25 face and/or eye's, etc.), and generate a scene understanding as context data 742 (e.g., identifying people, objects, etc. of the content 702 and the environment 704). For example, the scene understanding instruction set 740 acquires content 702 and sensor data 722 (e.g., image data) from the sensor 720 (e.g., an RGB camera, a depth camera, etc.) and determines context data 742 based on identifying one or more objects in the physical environment 704 and/or the view of the content 702 which may include a view of the physical environment 704 (e.g., identifies objects 705, 706). Alternatively, the scene understanding instruction set 740 selects context data associated with content 702 from a context database 745 (e.g., if the content 702 was previously analyzed by the scene understanding instruction set, e.g., a previously viewed/analyzed video). In some implementations, the scene understanding instruction set 740 generates a scene understanding associated with content 702 and/or environment 704 as the context data 742. For example, the scene understanding can be utilized to track the overall context of what the user may be focused on during the presentation of content 702, or where the user is, what the user is doing, what physical objects or people are in the vicinity of the user with respect to the environment 704.

In an example implementation, the environment 700 further includes a retention assessment and feedback instruction set 750 that is configured with instructions executable by a processor to assess physiological data and a scene understanding of a physical environment to determine a retention state associated with retention of a concept and provide feedback based on the assessment using one or more of the techniques discussed herein or as otherwise may be appropriate. In particular, the retention assessment and feedback instruction set 750 acquires context data 742 from the scene understanding instruction set 740, physiological tracking data 732 from the physiological tracking instruction set 730 during the presentation of the content 702 while the user is viewing content 702 (e.g., reading text, or looking at a particular object). The context data 742 may provide a scene analysis that can be used by the retention assessment and feedback instruction set 750 to understand what the person is looking at, where they are at, etc., and improve the assessment of the concept retention of the user with respect to a relevant object (e.g., objects 705, 706, etc.).

In some implementations, the retention assessment and feedback instruction set 750 can then provide feedback data 752 to the user 25 via the content instruction set 710 based on the retention state assessment. In some implementations, the feedback data 752 is provided to a content developer based on identifying the retention state of the user 25. The feedback data 752 may include the physiological tracking data 732, the context data 742, data associated with the user interactions of the content 702 (e.g., user clicking on particular icons, and the like). For example, providing performance feedback during a learning experience that could enhance a user's experience, provide additional benefits from the session, and provide a guided and supportive teaching approach (e.g., a scaffolding teaching method) for users to advance their retention (e.g., feedback content element 660, a notification text bubble or an arrow to point out a relevant selection).

Additionally, for example, a correlation may be determined for some event (e.g., eye movement towards a relevant object), and then the user interface (e.g., content instruction set 710) performs a response, such as user "clicks" on a user interface element (e.g., some objects are distracting and may be removed, such as bystanders 620, 622 in FIG. 6). The content 702 may be updated based on the feedback data may reduce salience of non-relevant objects (e.g., no longer relevant after some time) when the algorithm detects a higher likelihood of making a non-relevant transition.

In some implementations, the feedback may include encouraging a user to revisit particular objects, such as all of the relevant (key) objects. The feedback may include encouraging more relevant transitions by optimally distributing the objects in a 3D space. In some implementations, the feedback data 752 may allow the content instruction set 710 or content creators to improve user-object interactions with relevant objects that would increase recall. For example, instead of creating a read-only text object, make it multi-modal with a voice over. Additionally, or alternatively, colors could be added to a read-only text object to highlight a particular relevant portion and/or to categorize information (e.g., highlighting particular areas of text such as feedback content element 672 in FIG. 6C).

In some implementations, the feedback data 752 could be utilized by the content instruction set 710 to present an audio and/or visual feedback cue or mechanism to the user 25 (e.g., feedback content element 660, a notification text bubble or an arrow to point out a relevant selection). In an educational experience, the feedback cue to the user could be a gentle reminder (e.g., a soothing or calming visual and/or audio alarm) to get back on the task of studying, based on the assessment from the retention assessment and feedback instruction set 750 that the user 25 is mind wandering because the user 25 was transitioning more to irrelevant objects than to relevant objects.

In some implementations, an experience database may be utilized to store information associated with the user 25. For example, historical data may be stored and later analyzed. For example, after each learning session, the physiological tracking data 732, context data 742, a retention level, etc., may be monitored and stored in a experience database, before, during, and/or after the customized feedback content (e.g., feedback data 752) is presented to the user. In some implementations, the retention level may be determined based on an analysis of historical data associated with the user 25 for prior learning experiences to determine retention prediction based on specific interactions with virtual/real-world objects that are indicative of memory/concept retention. Alternatively, in some implementations, the concept retention level for one or more relevant objects may be determined based on accessing a user profile stored in an experience database.

Figure 8:
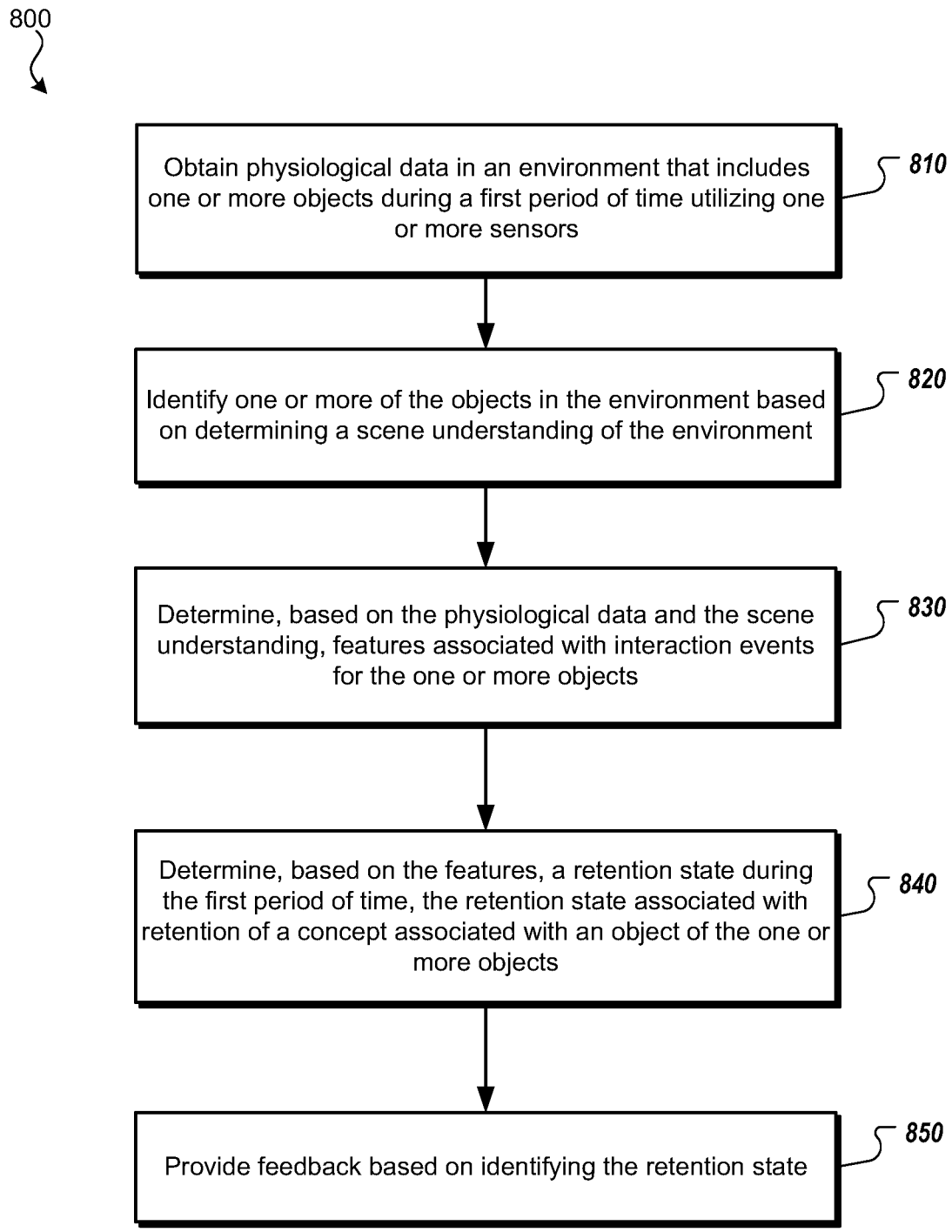
FIG. 8 is a flowchart representation of a method for assessing physiological data of a user and a scene understanding of a physical environment to determine a retention state in accordance with some implementations.

FIG. 8 is a flowchart illustrating an exemplary method 800. In some implementations, an electronic device having a processor and one or more sensors (e.g., device 10 of FIG. 1) performs the techniques of method 800 to assessing physiological data of a user and a scene understanding of a physical environment to determine a retention state according to some implementations. In some implementations, the techniques of method 800 are performed on a mobile device, desktop, laptop, HMD, or server device. In some implementations, the method 800 is performed on processing logic, including hardware, firmware, software, or a combination thereof. In some implementations, the method 800 is performed on a processor executing code stored in a non-transitory computer-readable medium (e.g., a memory).

At block 810, the method 800 obtains physiological data in an environment during a first period of time utilizing the one or more sensors, the environment including one or more objects. For example, eye data, head data, and/or hand gesture data may be obtained during presentation of content in an environment that may be a physical environment, a virtual environment, or a mixed reality environment. The sensor data (e.g., live data, such as video content that includes light intensity data (RGB) and depth data) may be associated with a point in time, such as images from inward/downward facing sensors while the user is wearing an HMD associated with a frame (e.g., sensors 35a, 35b, 35c as shown in FIG. 1). In some implementations, the sensor data includes depth data (e.g., infrared, time-of-flight, etc.) and light intensity image data obtained during a scanning process.

In some implementations, the physiological data includes eye data associated with a gaze that is acquired during the first period of time. In some implementations, the information for the eyes may be acquired for both azimuth and elevation for both position and velocity for each eye (e.g., eight channels of data for the classification algorithm). In some implementations, the eye data may further include IPD information (e.g., one channel of data for the classification algorithm) and a pupil diameter for the left eye and the right eye (e.g., two channels of data for the classification algorithm). Obtaining eye data may involve obtaining EEG information, images of the eye, and/or EOG data from which gaze direction, gaze angle, and/or eye movement can be determined. In some implementations, the eye data may further include a direction of the gaze, a velocity of the gaze, or a combination thereof.

In some implementations, obtaining physiological data (e.g., pupillary data 40) is associated with a gaze of a user that may involve obtaining images of the eye or electrooculography signal (EOG) data from which gaze direction and/or movement can be determined. In some implementations, the physiological data includes at least one of skin temperature, respiration, photoplethysmogram (PPG), electrodermal activity (EDA), eye gaze tracking, and pupillary movement that is associated with the user. In some implementations, obtaining physiological data includes head movements of the user (e.g., obtained from an IMU or from image sensor data), such as head tracking data.

In some implementations, the physiological data includes head data and body movement data (e.g., hand gesture data) acquired during the first period of time. The head/body data may include images of a head/body of the user from the one or more sensors. In some implementations, obtaining the head data includes tracking a pose and a movement of the head (or hand gestures) of the user. For example, head/hand motion and pose may be acquired based on position information and velocity information acquired from one or more sensors. The information for the head/body may be acquired for both azimuth and elevation for both position and velocity (e.g., four channels of data for the classification algorithm). Obtaining the head/body data may involve obtaining images of the head (e.g., RGB or IR), IMU, depth sensing from IFC, IR flood light, and the like.

In some implementations, obtaining sensor data associated with the head data may include obtaining a second set of data corresponding to one or more partial views of the face from one or more image sensors while a user is using (e.g., wearing) an electronic device (e.g., HMD). For example, obtaining sensor data may include obtaining live image data. In some implementations, the second set of data includes partial images of the face of the user and thus may not represent all of the features of the face that are represented in the enrollment data. For example, the second set of images may include an image of some of the foreface/brow eyes (e.g., facial feature characteristic data 40a) from an upward-facing sensor (e.g., sensor 35a of FIG. 1). Additionally, or alternatively, the second set of images may include an image of some of the eyes (e.g., eye gaze characteristic data 40b) from an inward-facing sensor (e.g., sensor 35b of FIG. 1). Additionally, or alternatively, the second set of images may include an image of some of the cheeks, mouth, and chin (e.g., facial feature characteristic data 40c) from a downward facing sensor (e.g., sensor 35c of FIG. 1). In some implementations, the electronic device includes a first sensor (e.g., sensor 35a of FIG. 1) and a second sensor (e.g., sensor 35c of FIG. 1), where the second set of data is obtained from at least one partial image of the face of the user from the first sensor from a first viewpoint (e.g., upper facial characteristic data 40a) and from at least one partial image of the face of the user from the second sensor from a second viewpoint (e.g., lower facial characteristic data 40c) that is different than the first viewpoint (e.g., multiple IFC cameras to capture different viewpoints of the user's facial and body movements).

In some implementations, determining the movement and/or the location and features of the head 27 of the user 25 (e.g., an edge of the eye, a nose or a nostril) are extracted by the device 10 and used in finding coarse location coordinates of the eyes 45 of the user 25, thus simplifying the determination of precise eye 45 features (e.g., position, gaze direction, etc.) and making the gaze characteristic(s) measurement and corresponding reading characteristics more reliable and robust. Furthermore, the device 10 may readily combine the 3D location of parts of the head 27 with gaze angle information obtained via eye part image analysis in order to identify a given on-screen object at which the user 25 is looking at any given time. In some implementations, the use of 3D mapping in conjunction with gaze tracking allows the user 25 to move his or her head 27 and eyes 45 freely while reducing or eliminating the need to actively track the head 27 using sensors or emitters on the head 27.

Some implementations obtain physiological data and other user information to help improve a user experience. In such processes, user preferences and privacy should be respected, as examples, by ensuring the user understands and consents to the use of user data, understands what types of user data are used, has control over the collection and use of user data and limiting distribution of user data, for example, by ensuring that user data is processed locally on the user's device. Users should have the option to opt in or out with respect to whether their user data is obtained or used or to otherwise turn on and off any features that obtain or use user information. Moreover, each user will have the ability to access and otherwise find out anything that the system has collected or determined about him or her. User data is stored securely on the user's device. User data that is used as input to a machine learning model is stored securely on the user's device, for example, to ensure the user's privacy. The user's device may have a secure storage area, e.g., a secure enclave, for securing certain user information, e.g., data from image and other sensors that is used for face identification or biometric identification. The user data associated with the user's body and/or attentive state may be stored in such a secure enclave, restricting access to the user data and restricting transmission of the user data to other devices to ensure that user data is kept securely on the user's device. User data may be prohibited from leaving the user's device and may be used only in machine learning models and other processes on the user's device.

At block 820, the method 800 identifies the one or more of the objects in the environment based on determining a scene understanding of the environment. For example, in a physical environment, a scene understanding instruction set identifies one or more of the objects in the environment based on obtaining sensor data from the one or more sensors corresponding to the environment. For example, in a virtual environment a scene understanding instruction set identifies one or more of the objects in the environment based on the presented content. In some implementations, identifying one or more of the objects may include determining positions of each object based on images the user's current room, depth data, etc. Additionally, in some implementations, location, speed, and direction of motion of objects in a scene may be determined as a part of the scene understanding of the environment.

In some implementations, the physical environment includes one or more objects, and determining the scene understanding of the physical environment includes determining a location, a speed, or a direction of motion of the one or more objects. For example, determining a scene understanding may include identifying one or more of the objects and their positions based on images the user's current room, depth data, etc., including location, speed, direction of motion of objects in the scene/environment. In some implementations, determining a scene understanding includes generating a three-dimensional (3D) representation of the physical environment. For example, after a scanning process, a 3D model, such as a 3D point cloud or a 3D rendering, may be generated for the physical environment and/or the objects within the physical environment.

In some aspects, the method 800 determines a context of the experience based on sensor data of the environment. For example, determining a context may involve using computer vision to generate a scene understanding of the visual and/or auditory attributes of the environment—where is the user, what is the user doing, what objects are nearby. Additionally, a scene understanding of the content presented to the user may be generated that includes the visual and/or auditory attributes of what the user was watching.

In some aspects, different contexts of the content presented and the environment are analyzed to determine where the user is, what the user is doing, what objects or people are nearby in the environment or within the content, and what the user did earlier. Additionally, context analysis may include image analysis (semantic segmentation), audio analysis (jarring sounds), location sensors (where user is), motion sensors (fast moving vehicle), and even access other user data (e.g., a user's calendar). In an exemplary implementation, the method 800 may further include determining the context of the experience by generating a scene understanding of the environment based on the sensor data of the environment, the scene understanding including visual or auditory attributes of the environment, and determining the context of the experience based on the scene understanding of the environment.

In some implementations, the sensor data includes image data, and generating the scene understanding is based at least on performing semantic segmentation of the image data and detecting one or more objects within the environment based on the semantic segmentation. In some implementations, determining the context of the experience includes determining an activity of the user based on the scene understanding of the environment. In some implementations, the sensor data includes location data of the user, and determining the context of the experience includes determining a location of the user within the environment based on the location data.

At block 830, the method 800 determines, based on the physiological data and the scene understanding, features associated with interaction events for the one or more objects. For example, determining features associated with interaction events for the one or more objects may include segregating objects into salient/non-salient regions, text vs non-text relevant objects, etc. In some implementations, the features associated with interaction events for the one or more objects may include time spent fixated on objects, a number of revisits to the same object, average change in pupil diameter across different visits, blinks during different visits, saccade amplitudes/velocities while exploring the object, and the like.

In some implementations, interactions over time are used to determine features that are input into a machine learning algorithm trained to predict subsequent fact memory. In some implementations, the features were identified based on user experiments for a plurality of different users that include user instructions to focus on a particular object of the one or more objects during a study period of time, wherein physiological data is obtained for a plurality of different users during the study period of time. For example, user studies/experiments may include having a user to focus on a particular phrase or a portion of an image to memorize, and as the user is focusing his or her attention upon that phrase (or a portion of an image), physiological data may be collected and determined as features of an interaction event. In some implementations, the determined features include at least one of a time spent of a gaze fixated on the one or more objects, a number of revisits to the one or more objects, an average change in pupil diameter during the first period of time, blinks during different subsequent periods of time, or saccade amplitudes/velocities while exploring the one or more objects during the first period of time. For example, some of these features (e.g., machine learning inputs) may include time spent fixated on objects, a number of revisits to the same object, average change in pupil diameter across different visits, blinks during different visits, saccade amplitudes/velocities while exploring the object, and the like.

In some implementations, determining features may include determining features associated with interaction events for one or more objects based on determining salient and non-salient regions associated with the one or more objects (e.g., salient region 550) and determining gaze intersections with a salient region or a non-salient region (e.g., determining a user is focusing his or her gaze upon salient region 550).

In some implementations, determining features associated with interaction events for the one or more objects includes determining scene-induced pupil response variation characteristics for a particular object of the one or more objects, and determining an interaction event based on the scene-induced pupil response variation characteristics for the particular object. For example, when a user's gaze intersects with an object or user interface element, a machine learning model can be trained to predict "click" or "no click" for each time point, based on the presence of an attention-induced pupil response.

At block 840, the method 800 determines, based on the features, a retention state during the first period of time, the retention state associated with retention of a concept associated with an object of the one or more objects. For example, the determined features may be input into a machine learning algorithm trained to predict subsequent fact memory, such that one or more gaze, head pose, and hand gesture characteristics may be determined, aggregated, and used to classify the user's eye movement and retention state using machine learning techniques to identify specific interactions with virtual/real-world objects that contribute to the learning/productivity experience.

In some implementations, the retention state may be based on assessing transitions amongst multiple objects. For example, graph 300 of FIG. 3 provides an example illustration of how a user may transition between objects (relevant and irrelevant objects) in a learning experience. The utilization of tracking gaze transitions between relevant and irrelevant objects is unique for retention prediction because it requires custom annotation but only a single simple binary label from a content developer (e.g., determining whether the object is relevant for a learning experience), and uses that information to derive a metric of structure in the pattern of gaze over time.

In some implementations, the retention state during the first period of time is based on using a machine learning classifier model, and the physiological data are input into the machine learning classification model to identify the retention of the concept associated with the object. For example, features are input into a machine learning algorithm (e.g., a trained neural network) to predict subsequent fact memory. In some implementations, the machine learning classification model is trained based on a plurality of eye characteristics, head pose characteristics, and hand gesture characteristics.

At block 850, the method 800 provides feedback based on identifying the retention state. In some implementations, the feedback may be provided directly to users. Additionally, or alternatively, in some implementations, the feedback is provided to a content developer based on identifying the retention state of the user. The feedback data may include the physiological data, the context data, data associated with the user interactions of the content (e.g., user clicking on particular icons, and the like). For example, providing performance feedback during a learning experience that could enhance a user's experience, provide additional benefits from the session, and provide a guided and supportive teaching approach (e.g., a scaffolding teaching method) for users to advance their retention (e.g., feedback content element 660, a notification text bubble or an arrow to point out a relevant selection). Additionally, for example, a correlation may be determined for some event (e.g., eye movement towards a relevant object), and then the user interface (e.g., content instruction set 710) performs a response, such as user "clicks" on a user interface element (e.g., some objects are distracting and may be removed, such as bystanders 620, 622 in FIG. 6). The content may be updated based on the feedback data may reduce salience of non-relevant objects (e.g., no longer relevant after some time) when the algorithm detects a higher likelihood of making a non-relevant transition.

In some implementations, the feedback may be provided directly to users by updating a view of a display of the electronic device during the first period of time. In some implementations, updating the view of the display is based on the physiological data (e.g., based on head/eye movements, user interface performs an action). In some implementations, providing the feedback based on identifying the retention state includes providing a level of quality of retention of the concept associated with the object, and providing a notification based on the concept associated with the object. For example, provide more explicit feedback on what the user may have missed out and redirect the user to certain learning segments. Additionally, the system may suggest to optimally revisit certain objects, suggest more engagement/exploration to have more interaction with particular (relevant) objects.

In some implementations, providing the feedback based on identifying the retention state includes adjusting content in response to determining an interaction event associated with the retention of the concept associated with the object. For example, the content may be adapted to increase the difficulty (e.g., more information to review) as the learner progresses (e.g., higher memory retention then more challenging lessons, but lower memory retention then simpler/ clearer lessons). In some implementations, the feedback may include encouraging a user to revisit particular objects, such as all of the relevant (key) objects. The feedback may include encouraging more relevant transitions by optimally distributing the objects in a 3D space. In some implementations, the feedback data 752 may allow the content instruction set 710 or content creators to improve user-object interactions with relevant objects that would increase recall. For example, instead of creating a read-only text object, make it multi-modal with a voice over. Additionally, or alternatively, colors could be added to a read-only text object to highlight a particular relevant portion and/or to categorize information (e.g., highlighting particular areas of text such as feedback content element 672 in FIG. 6C).

In some implementations, the method 800 further includes determining, based on the features, a plurality of retention states during multiple periods of time, aggregating the determined features associated with the plurality of retention states associated with multiple objects of the one or more objects, and updating the feedback based on the aggregated features. For example, aggregate their attentional and behavioral measures and let the users know about their most/least favorite topics, suggest taking a break from the environment and shift to more relaxing environment, aggregate measures to inform users about their most productive days in the week and the time of the day (mornings vs evenings etc.), suggest different time of the day for different type of productive activities. For example, the user may be encouraged to do memorization heavy tasks in the morning and problem-solving in the afternoon.

Figure 9:
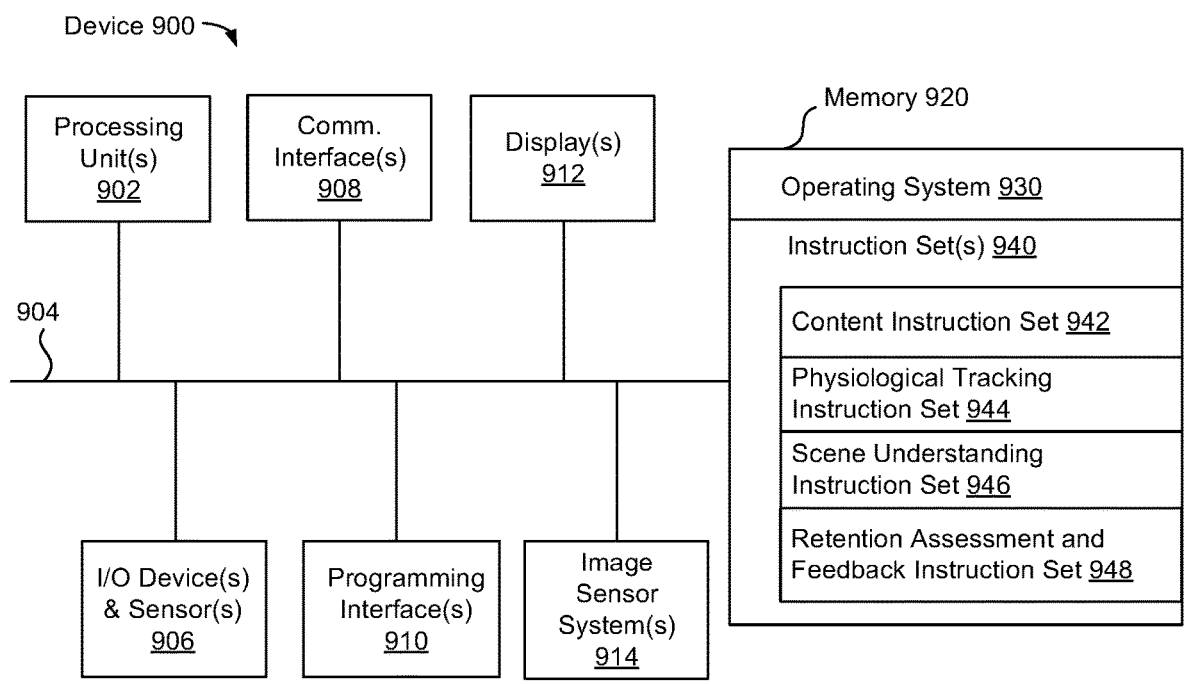
FIG. 9 is a block diagram illustrating device components of an exemplary device according to some implementations.

FIG. 9 is a block diagram of an example device 900. Device 900 illustrates an exemplary device configuration for device 10. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/ or the like type interface), one or more programming (e.g., I/O) interfaces 910, one or more displays 912, one or more interior and/or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 912 are configured to present a view of a physical environment or a graphical environment to the user. In some implementations, the one or more displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 912 correspond to diffractive, reflective, polarized, holographic, etc. waveguide displays. In one example, the device 10 includes a single display. In another example, the device 10 includes a display for each eye of the user.

In some implementations, the one or more image sensor systems 914 are configured to obtain image data that corresponds to at least a portion of the physical environment 105. For example, the one or more image sensor systems 914 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 914 further include illumination sources that emit light, such as a flash. In various implementations, the one or more image sensor systems 914 further include an on-camera image signal processor (ISP) configured to execute a plurality of processing operations on the image data.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 includes a non-transitory computer readable storage medium.

In some implementations, the memory 920 or the non-transitory computer readable storage medium of the memory 920 stores an optional operating system 930 and one or more instruction set(s) 940. The operating system 930 includes procedures for handling various basic system services and for performing hardware dependent tasks. In some implementations, the instruction set(s) 940 include executable software defined by binary information stored in the form of electrical charge. In some implementations, the instruction set(s) 940 are software that is executable by the one or more processing units 902 to carry out one or more of the techniques described herein.

The instruction set(s) 940 include a content instruction set 942, a physiological tracking instruction set 944, a scene understanding instruction set 946, and a retention assessment and feedback instruction set 948. The instruction set(s) 940 may be embodied a single software executable or multiple software executables.

In some implementations, the content instruction set 942 is executable by the processing unit(s) 902 to provide and/or track content for display on a device. The content instruction set 942 may be configured to monitor and track the content over time (e.g., during an experience) and/or to identify change events that occur within the content (e.g., based on identified/classified behavior gaze events). In some implementations, the content instruction set 942 may be configured to inject change events into content (e.g., feedback mechanisms) using one or more of the techniques discussed herein or as otherwise may be appropriate. To these ends, in various implementations, the instruction includes instructions and/or logic therefor, and heuristics and metadata therefor.

In some implementations, the physiological tracking instruction set 944 is executable by the processing unit(s) 902 to track a user's physiological attributes (e.g., EEG amplitude/frequency, pupil modulation, gaze, head pose/location data, heart rate, EDA data, etc.) using one or more of the techniques discussed herein or as otherwise may be appropriate. To these ends, in various implementations, the instruction includes instructions and/or logic therefor, and heuristics and metadata therefor.

In some implementations, the scene understanding instruction set 946 is executable by the processing unit(s) 902 to determine a context of the experience and/or the environment (e.g., create a scene understanding to determine the objects or people in the content or in the environment, where the user is, what the user is watching, etc.) using one or more of the techniques discussed herein (e.g., object detection, facial recognition, etc.) or as otherwise may be appropriate. To these ends, in various implementations, the instruction includes instructions and/or logic therefor, and heuristics and metadata therefor.

In some implementations, the retention assessment and feedback instruction set 948 is executable by the processing unit(s) 902 to assess the physiological data (e.g., eye data, head data, hand gesture data, etc.) to determine a retention state associated with retention of a concept and provide feedback based on the assessment using one or more of the techniques discussed herein or as otherwise may be appropriate. To these ends, in various implementations, the instruction includes instructions and/or logic therefor, and heuristics and metadata therefor.

Although the instruction set(s) 940 are shown as residing on a single device, it should be understood that in other implementations, any combination of the elements may be located in separate computing devices. Moreover, FIG. 9 is intended more as functional description of the various features which are present in a particular implementation as opposed to a structural schematic of the implementations described herein. As recognized by those of ordinary skill in the art, items shown separately may be combined and some items may be separated. The actual number of instructions sets and how features are allocated among them may vary from one implementation to another and may depend in part on the particular combination of hardware, software, and/or firmware chosen for a particular implementation.

Figure 10:
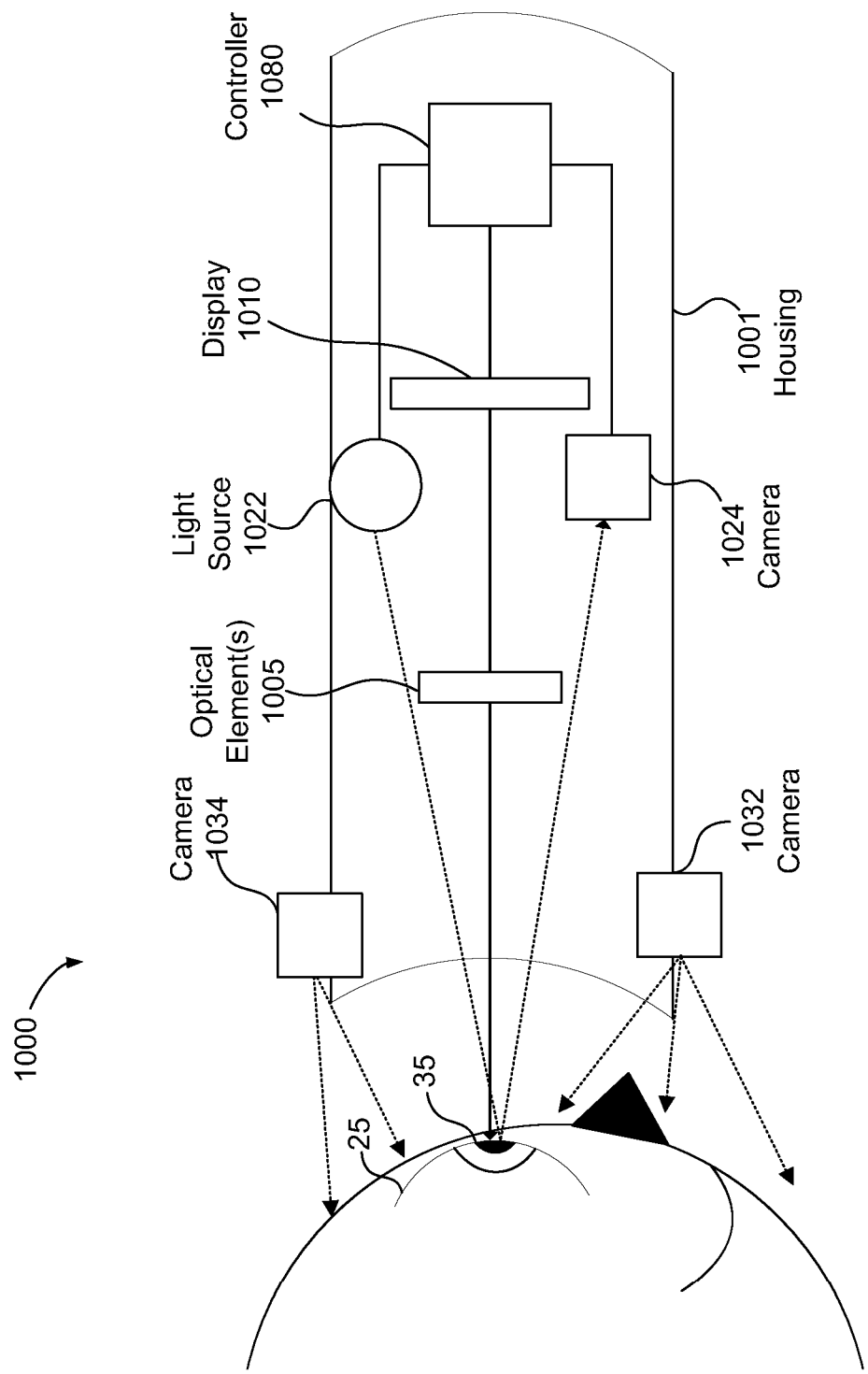
FIG. 10 is a block diagram of an example head-mounted device (HMD) in accordance with some implementations.

FIG. 10 illustrates a block diagram of an exemplary head-mounted device 1000 in accordance with some implementations. The head-mounted device 1000 includes a housing 1001 (or enclosure) that houses various components of the head-mounted device 1000. The housing 1001 includes (or is coupled to) an eye pad (not shown) disposed at a proximal (to the user 25) end of the housing 1001. In various implementations, the eye pad is a plastic or rubber piece that comfortably and snugly keeps the head-mounted device 1000 in the proper position on the face of the user 25 (e.g., surrounding the eye of the user 25).

The housing 1001 houses a display 1010 that displays an image, emitting light towards or onto the eye of a user 25. In various implementations, the display 1010 emits the light through an eyepiece having one or more optical elements 1005 that refracts the light emitted by the display 1010, making the display appear to the user 25 to be at a virtual distance farther than the actual distance from the eye to the display 1010. For example, optical element(s) 1005 may include one or more lenses, a waveguide, other diffraction optical elements (DOE), and the like. For the user 25 to be able to focus on the display 1010, in various implementations, the virtual distance is at least greater than a minimum focal distance of the eye (e.g., 7 cm). Further, in order to provide a better user experience, in various implementations, the virtual distance is greater than 1 meter.

The housing 1001 also houses a tracking system including one or more light sources 1022, camera 1024, camera 1032, camera 1034, and a controller 1080. The one or more light sources 1022 emit light onto the eye of the user 25 that reflects as a light pattern (e.g., a circle of glints) that can be detected by the camera 1024. Based on the light pattern, the controller 1080 can determine an eye tracking characteristic of the user 25. For example, the controller 1080 can determine a gaze direction and/or a blinking state (eyes open or eyes closed) of the user 25. As another example, the controller 1080 can determine a pupil center, a pupil size, or a point of regard. Thus, in various implementations, the light is emitted by the one or more light sources 1022, reflects off the eye of the user 25, and is detected by the camera 1024. In various implementations, the light from the eye of the user 25 is reflected off a hot mirror or passed through an eyepiece before reaching the camera 1024.

The display 1010 emits light in a first wavelength range and the one or more light sources 1022 emit light in a second wavelength range. Similarly, the camera 1024 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 1010 by looking at it), provide foveated rendering (e.g., present a higher resolution in an area of the display 1010 the user 25 is looking at and a lower resolution elsewhere on the display 1010), or correct distortions (e.g., for images to be provided on the display 1010).

In various implementations, the one or more light sources 1022 emit light towards the eye of the user 25 which reflects in the form of a plurality of glints.

In various implementations, the camera 1024 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 1024 is an event camera including a plurality of light sensors (e.g., a matrix of light sensors) at a plurality of respective locations that, in response to a particular light sensor detecting a change in intensity of light, generates an event message indicating a particular location of the particular light sensor.

In various implementations, the camera 1032 and camera 1034 are frame/shutter-based cameras that, at a particular point in time or multiple points in time at a frame rate, can generate an image of the face of the user 25. For example, camera 1032 captures images of the user's face below the eyes, and camera 1034 captures images of the user's face above the eyes. The images captured by camera 1032 and camera 1034 may include light intensity images (e.g., RGB) and/or depth image data (e.g., Time-of-Flight, infrared, etc.).

According to some implementations, the electronic devices (e.g., device 10) can generate and present an extended reality (XR) environment to one or more users during a communication session. In contrast to a physical environment that people can sense and/or interact with without aid of electronic devices, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at an electronic device having a processor and one or more sensors:
obtaining physiological data in an environment during a first period of time utilizing the one or more sensors, the environment comprising one or more objects;
identifying the one or more of the objects in the environment based on determining a scene understanding of the environment;
determining, based on the physiological data and the scene understanding, a feature associated with an eye, wherein the feature corresponds to an interaction event involving an interaction with at least a portion of a particular object of the one or more objects;
determining, based on the feature that corresponds to an interaction event with the at least the portion of the particular object, a retention state during the first period of time, the retention state associated with retention of a concept to predict subsequent fact memory associated with the particular object of the one or more objects; and
providing feedback based on identifying the retention state.

2. The method of claim 1, wherein the physiological data comprises positional information and velocity information for a left eye and a right eye.

3. The method of claim 1, wherein the physiological data comprises an interpupillary distance (IPD) between a right eye and a left eye, and a diameter of the left eye and a diameter of the right eye.

4. The method of claim 1, wherein the physiological data comprises:
a direction of a gaze;
a velocity of the gaze; or
pupillary fixations.

5. The method of claim 1, wherein the physiological data comprises an image of an eye or electrooculography (EOG) data.

6. The method of claim 1, wherein the physiological data comprises images of a head from the one or more sensors.

7. The method of claim 1, wherein obtaining the physiological data comprises tracking a pose and a movement of a head.

8. The method of claim 1, wherein determining the scene understanding of the environment comprises determining a location, a speed, or a direction of motion of at least one of the one or more objects.

9. The method of claim 1, wherein determining the scene understanding comprises generating a three-dimensional (3D) representation of the environment.

10. The method of claim 1, wherein the scene understanding is based on obtaining sensor data from the one or more sensors corresponding to a physical environment.

11. The method of claim 1, wherein the one or more objects comprises multiple objects, and wherein determining the retention state during the first period of time is based on assessing transitions amongst the multiple objects.

12. The method of claim 1, wherein the determined feature associated with the eye comprises at least one of:
a time spent of a gaze fixated on the one or more objects;
a number of revisits to the one or more objects;
an average change in pupil diameter during the first period of time;
blinks during different subsequent periods of time; or
saccade amplitudes/velocities while exploring the one or more objects during the first period of time.

13. The method of claim 1, wherein the feature was identified based on user experiments for a plurality of different users that include user instructions to focus on a particular object of the one or more objects during a study period of time, wherein physiological data is obtained for a plurality of different users during the study period of time.

14. The method of claim 1, wherein determining the feature associated with the eye is based on:
determining salient and non-salient regions associated with the one or more objects; and
determining gaze intersections with a salient region or a non-salient region.

15. The method of claim 1, wherein determining the feature associated with the eye comprises:
determining scene-induced pupil response variation characteristics for a particular object of the one or more objects; and
determining an interaction event based on the scene-induced pupil response variation characteristics for the particular object.

16. The method of claim 1, wherein providing the feedback based on identifying the retention state comprises:
updating a view of a display of the electronic device during the first period of time.

17. The method of claim 16, wherein updating the view of the display is based on the physiological data.

18. The method of claim 1, wherein providing the feedback based on identifying the retention state comprises:
adjusting content in response to determining an interaction event associated with the retention of the concept associated with the object.

19. The method of claim 1, providing the feedback based on identifying the retention state comprises:
providing a level of quality of retention of the concept associated with the object; and
providing a notification based on the concept associated with the object.

20. The method of claim 1, further comprising:
determining, a plurality of features associated with a plurality of retention states during multiple periods of time;
aggregating the determined feature associated with the plurality of retention states associated with multiple objects of the one or more objects; and
updating the feedback based on the aggregated feature.

21. The method of claim 1, wherein the retention state during the first period of time is based on using a machine learning classifier model, wherein the physiological data are input into the machine learning classification model to identify the retention of the concept associated with the object.

22. The method of claim 21, wherein the machine learning classification model is trained based on a plurality of eye characteristics, head pose characteristics, and hand gesture characteristics.

23. The method of claim 1, wherein the physiological data is obtained from sensor data from the one or more sensors, and wherein the sensor data comprises depth data and light intensity image data obtained during a scanning process.

24. A device comprising one or more sensors, a non-transitory computer-readable storage medium and one or more processors coupled to the non-transitory computer-readable storage medium, wherein the non-transitory computer-readable storage medium comprises program instructions that, when executed on the one or more processors, cause the one or more processors to perform operations comprising:
  obtaining physiological data in an environment during a first period of time utilizing the one or more sensors, the environment comprising one or more objects;
  identifying the one or more of the objects in the environment based on determining a scene understanding of the environment;
  determining, based on the physiological data and the scene understanding, a feature associated with an eye, wherein the feature corresponds to an interaction event involving an interaction with at least a portion of a particular object of the one or more objects;
  determining, based on the feature that corresponds to an interaction event with the at least the portion of the particular object, a retention state during the first period of time, the retention state associated with retention of a concept to predict subsequent fact memory associated with the particular object of the one or more objects; and
  providing feedback based on identifying the retention state.

25. A non-transitory computer-readable storage medium, storing program instructions executable by one or more processors on a device to perform operations comprising:
  obtaining physiological data in an environment during a first period of time utilizing one or more sensors, the environment comprising one or more objects;
  identifying the one or more of the objects in the environment based on determining a scene understanding of the environment;
  determining, based on the physiological data and the scene understanding, a feature associated with an eye, wherein the feature corresponds to an interaction event involving an interaction with at least a portion of a particular object of the one or more objects;
  determining, based on the feature that corresponds to an interaction event with the at least the portion of the particular object, a retention state during the first period of time, the retention state associated with retention of a concept to predict subsequent fact memory associated with the particular object of the one or more objects; and
  providing feedback based on identifying the retention state.

* * * * *